(12) United States Patent
Ellis

(10) Patent No.: US 11,905,139 B2
(45) Date of Patent: Feb. 20, 2024

(54) FISHING REEL DRAG SET DEVICE

(71) Applicant: Scott Ellis, Canyon Lake, CA (US)

(72) Inventor: Scott Ellis, Canyon Lake, CA (US)

( * ) Notice: Subject to any disclaimer, the term of this patent is extended or adjusted under 35 U.S.C. 154(b) by 331 days.

(21) Appl. No.: 17/527,660

(22) Filed: Nov. 16, 2021

(65) Prior Publication Data

US 2022/0234861 A1 Jul. 28, 2022

Related U.S. Application Data

(60) Provisional application No. 63/142,955, filed on Jan. 28, 2021.

(51) Int. Cl.
| | |
|---|---|
| *G01L 5/04* | (2006.01) |
| *G01L 5/103* | (2020.01) |
| *B65H 59/40* | (2006.01) |

(52) U.S. Cl.
CPC ............. *B65H 59/40* (2013.01); *G01L 5/047* (2013.01); *B65H 2220/03* (2013.01); *B65H 2407/22* (2013.01); *B65H 2551/21* (2013.01); *B65H 2551/24* (2013.01); *B65H 2553/21* (2013.01); *B65H 2701/355* (2013.01)

(58) Field of Classification Search
CPC ................ B65H 59/40; B65H 2220/03; B65H 2407/22; B65H 2551/21; B65H 2551/24; B65H 2553/21; B65H 2701/355; B65H 2551/02; G01L 5/047; G01L 5/04
See application file for complete search history.

(56) References Cited

U.S. PATENT DOCUMENTS

| | | | |
|---|---|---|---|
| 5,639,038 A * | 6/1997 | Hirose ...................... | G01L 5/04 242/223 |
| 2011/0138675 A1* | 6/2011 | Cutts ...................... | A01K 91/02 43/25 |
| 2019/0037825 A1* | 2/2019 | Du Plooy ............ | A01K 97/125 |

\* cited by examiner

*Primary Examiner* — Brandi N Hopkins
(74) *Attorney, Agent, or Firm* — Brennan, Manna & Diamond, LLC

(57) ABSTRACT

The present invention relates generally to the field of fishing drag scales. More specifically, the present invention relates to a fishing reel drag set device that is comprised of a body, an upper and lower housing, two eyelets and a power supply. The device may be adjustable or non-adjustable (i.e., static), wherein the adjustable version allots the user multiple tension settings for the line and the static version has only one tension setting. Other visual and audible elements such as colored LEDs, a speaker relay and visual and audio indicators are provided to help identify if the drag in the fishing line is too heavy or too light. Accordingly, the device can be applied to any fishing rod and fishing line to aid a fisherman in using a desired drag setting when attempting to catch a fish.

20 Claims, 3 Drawing Sheets

FISHING REEL DRAG SET DEVICE

CROSS-REFERENCE TO RELATED APPLICATION

The present application claims priority to, and the benefit of, U.S. Provisional Application No. 63/142,955, which was filed on Jan. 28, 2021 and is incorporated herein by reference in its entirety.

FIELD OF THE INVENTION

The present invention relates generally to the field of fishing drag scales. More specifically, the present invention relates to a fishing reel drag set device that is comprised of a body, an upper and lower housing, two eyelets and a power supply. The device may be adjustable or non-adjustable (i.e., static), wherein the adjustable version allots the user multiple tension settings for the line, and the static version has only one tension setting. Other visual and audible elements such as colored LEDs, a speaker relay, and visual and audio indicators are included to help identify if the drag in the fishing line is too heavy or too light. In this manner, the device can be applied to any fishing rod and fishing line to aid a fisherman in using a desired drag setting when attempting to catch a fish. Accordingly, the present disclosure makes specific reference thereto. Nonetheless, it is to be appreciated that aspects of the present invention are also equally applicable to other like applications, devices and methods of manufacture.

BACKGROUND

Once a fish is hooked onto the end of a fishing rod, it is important to allow a precise amount of drag in the line. If the drag is too light, the fish may shake the hook or pull the line off the reel. If the drag is too heavy, the fish may break the line or pull the hook. Even experienced fishermen have no way of determining the exact force at which the fish is pulling on the line, except via intuition that can only be obtained by experience. The size of the fish often determines the amount of drag a fisherman would want to apply, but a fisherman does not often know the size of the fish until after it is in the boat. Furthermore, without experience there is no way of knowing the desired amount of tension that should be set in the fishing line.

Therefore, there exists a long-felt need in the art for an improved fishing device. There also exists a long-felt need in the art for a drag set device that alerts the user when the desired tension in a fishing line is reached, or if there is a large amount of tension in the line. Additionally, there is a long-felt need for a drag set device that allows a user to set a fishing line to a desired amount of tension.

The subject matter disclosed and claimed herein, in one embodiment thereof, comprises a fishing reel drag set device. The device is comprised of a body, an upper housing, an LCD screen, a lower housing, a first eyelet, a second eyelet and an internal battery. The first end of the body has an eyelet that further has a continuous opening and a movable, shafted hook, which is attached to an internal load cell, spring or similar device within the body that measures the tension in the fish line (which is displayed by the LCD screen) or can be set to a specific tension. LED lights, a plurality of buttons, the LCD screen and a speaker are also accessible for user input, wherein the LED lights illuminate in differing colors to visually alert the user of different amounts of tension present in the fishing line, and the speaker then emits differing sounds to audibly alert the user of different amounts of tension observed in the fishing line.

In this manner, the fishing reel drag set device of the present invention accomplishes all the forgoing objectives and provides a means to set an appropriate amount of drag in a fishing line. Additionally, the device alerts the user if the tension in the line is too great. As a result, the device prevents a break in the line from occurring, which would allow the fish to escape.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a fishing reel drag set device. The device is comprised of a body, an upper housing, an LCD screen, a lower housing, a first eyelet, a second eyelet and an internal battery. The first end of the body has an eyelet that further has a continuous opening and a shafted hook. The hook can move axially in relation to the shaft, which is attached to an internal spring within the body that measures the tension in the fish line or can be set to a specific tension to set the fishing line at a specific tension. The second eyelet is attached to the second end of the body, and also has a continuous opening that allows the device to attach to a plurality of items such as, but not limited to: a keychain, fishing vest, tackle box, backpack or other fishing-related items.

Elements such as LED lights, buttons, an LCD screen, and a speaker, are accessible for user input and may be located on any surface of the body of the device. The device preferably has at least three LED lights of differing colors that illuminate to visually alert the user of different amounts of tension present in the fishing line. One or more buttons are also present and can be used to adjust the tension setting of the device. The LCD screen displays the set (or programmed) tension setting of the device, as well as the current tension of the device in real-time. The speaker then emits differing sounds to audibly alert the user of different amounts of tension observed in the fishing line. In addition, an alternate embodiment of the device may provide neither an LCD screen nor buttons, but may instead be comprised of a spring with a fixed tension.

Accordingly, the improved fishing reel drag set device of the present invention is particularly advantageous as it does not interfere with common fishing practices, such as reeling and casting. Further, the device can universally attach to any fishing rod in a way that does not damage the rod. Additionally, the device is capable of setting a desired amount of tension in the line. Therefore, the device eliminates the need for the user to guess how much drag should be applied, and instead allows the user to be confident in applying a desired amount of tension.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents.

Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
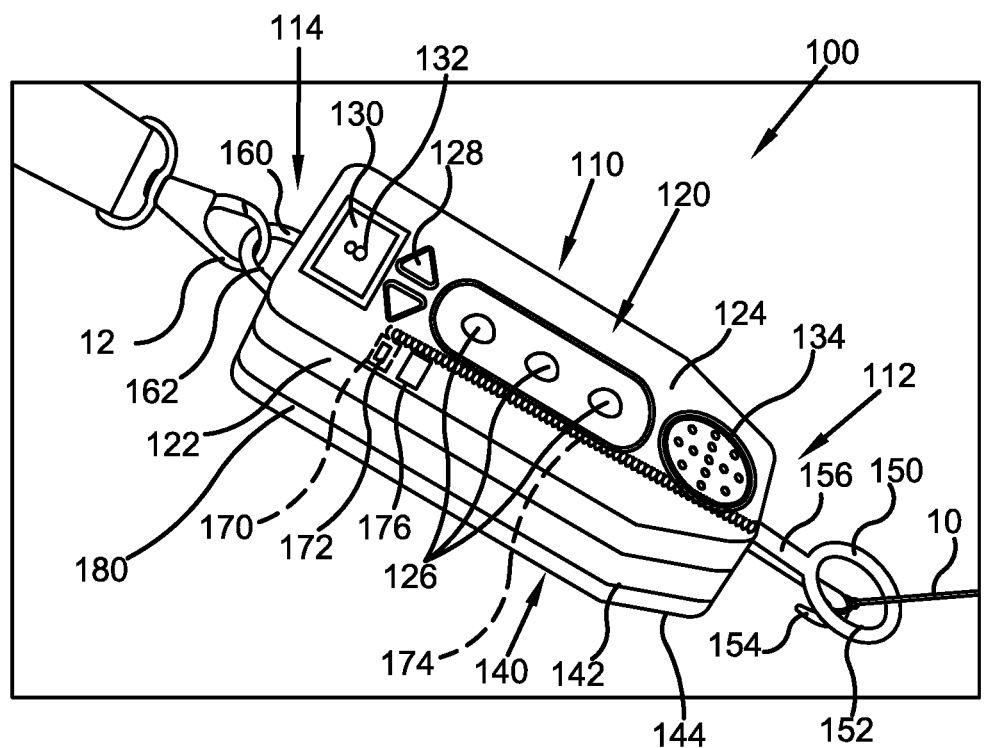
FIG. 1 illustrates a perspective view of one potential embodiment of the fishing reel drag set device of the present invention in accordance with the disclosed architecture; wherein the device is adjustable.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for an improved fishing device. There also exists a long-felt need in the art for a drag set device that allows the user to set fishing lines to a desired amount of tension. Finally, there exists a need for a device that alerts the user when the desired tension in the line is reached, or if there is a large amount of tension in the line.

The present invention, in one exemplary embodiment, is comprised of a fishing reel drag set device that allows users to set a desired amount of tension in fishing lines, and alerts the user when that tension is reached or is exceeded. The device is primarily comprised of a body, an upper housing, an LCD screen, a lower housing, two eyelets, and an internal battery. In differing embodiments, the body may have the appearance of a key fob with hooks on each end. The body may also be made of a plurality of flexible or semi-flexible plastic material and is waterproof. In addition, any surface of the body may be comprised of a plurality of indicia, such as patterns, logos, emblems, images, symbols, designs, letters, words, characters, animals, advertisements, brands, etc., that may or may not be fish or fisherman-related.

Further, the body has an upper and a lower housing, each made of the same material, that protects the electrical elements inside. The upper and lower housings may be fixedly-attached to one another, or removable and snap together, as long as the overall housing structure protects the components inside. The upper housing further comprises a plurality of buttons, at least three LED lights, an LCD screen and a speaker. On each end of the device, there is an eyelet that has a continuous opening. The first eyelet is comprised of a hook and shaft. The hook is movable and is attached to the internal spring, load cell or similar device and a fishing line. The shaft may be fixedly-attached to the body or removable. The second eyelet, attached to the opposite side of the device, is used for attachment to a keychain, vest, backpack or other convenient carrying device.

The device contains three or more LED lights and a speaker, wherein the lights send a visual signal to the user, while the speaker sends an audible signal. When 25% of the line class rating has been reached, one LED light illuminates green, and the speaker outputs a steady beeping sound. When between 25% and 33% of the line class rating has been reached, another LED illuminates yellow. When the line class rating exceeds 33%, another LED illuminates red, and the speaker outputs a solid tone. The LCD screen displays the tension setting that is inputted to the system by a user, via pressing the buttons, and also displays the real-time output of the tension in the fishing line while in use. An alternative embodiment of the device has no LCD screen and no buttons, and may only have one fixed tension setting. However, this embodiment has indicia to display the tension setting/value on the device. Other components inside the housing are comprised of a spring (or a load cell) used to measure the tension in the fishing line, a charging port and an internal battery that powers the LCD screen, the buttons, the speaker and any other component that requires power.

Accordingly, the improved fishing reel drag set device of the present invention is particularly advantageous as it improves the efficiency of currently used fishing practices. Further, the device can universally attach to any fishing rod and fishing line in a way that does not damage the rod or interfere with the rod's intended design. Additionally, the device controls the amount of tension in a fishing line with either a static amount of tension or a variable amount of tension. Therefore, the device eliminates the need for a user to guess how much tension should be applied to a fishing line while fishing.

Referring initially to the drawings, FIG. 1 illustrates a perspective view of one embodiment of the fishing reel drag set device 100 of the present invention that is adjustable. The device 100 is primarily comprised of a body 110, an upper housing 120, an LCD screen 130, a lower housing 140, a first eyelet 150, a second eyelet 160 and an internal battery 170. In the preferred embodiment of the device 100 shown in FIG. 1, the body 110 is shaped as a generally rectangular box. However, in differing embodiments, the body 110 may have a plurality of shapes and sizes that include at least one or more of rectangular, circular, square, triangular, etc., or any other suitable shape or size as is known in the art. Further, the body 110 may be made of a plurality of materials such as wood or metal, but is preferably made of a flexible or semi-flexible plastic, such as but not limited to: acrylic, polycarbonate, polyethylene, thermoplastic, acrylonitrile butadiene styrene, low density polyethylene, medium density polyethylene, high density polyethylene, polyethylene terephthalate, polyvinyl chloride, polystyrene, polylactic acid, acetal, nylon, fiberglass, etc., or any other suitable material as is known in the art. In addition, the body 110 is typically waterproof and may be transparent, semi-transparent or opaque in differing embodiments. Furthermore, the top surface 124, side surfaces 122, side surfaces 142 and bottom surface 144 of the body 110 may be comprised of any number of indicia 132 in the form of patterns, logos, emblems, images, symbols, designs, letters, words, characters, animals, advertisements, brands, etc., or any other suitable indicia as is known in the art, that may or may not be fish or fishing-related.

As shown in FIG. 1, the second eyelet 160 is attached to the second end of body 114 and comprises a continuous opening 162. The second end 114 of the body 110 and its attachments are designed to attach to a plurality of items such as, but not limited to, a keychain 12, a fishing vest, a tackle box, a backpack, or other fishing-related items, or any other suitable item as is known in the art. The upper housing 120 and lower housing 140 are fixedly-attached to one another or removably attached. The upper housing 120 and lower housing 140 protect the interior elements of the device 100, however elements such as LED lights 126, buttons 128, an LCD screen 130 and a speaker 134 are accessible for user input and may be located on any surface 122, 124, 142, 144 of the body 110, but preferably the top surface 124. Further, in order to protect the internal components, the housing 110 is waterproof and waterproofing measures can comprise one or more of the following: an O-ring/gasket 180, a sealant, a film, caulking, etc., or any other suitable waterproofing measures as are known in the art.

At least three LED lights 126 of differing colors illuminate to visually alert the user of different amounts of tension present on the fishing line 10. One or more buttons 128 adjust the tension setting of the device 100. The LCD screen 130 then displays the set (or programmed) tension setting, as well as the current tension of the fishing line 10 in real-time. A speaker 134 omits differing sounds to audibly alert the user of the different amounts of tension observed in the fishing line 10. In a preferred embodiment, when 25% of the fishing line 10 class rating has been reached, one LED 126 illuminates green and the speaker 134 outputs a steady beeping sound. When between 25% and 33% of the fishing line 10 class rating has been reached, another LED 126 illuminates yellow. When the fishing line 10 class rating exceeds 33%, another LED 126 illuminates red and the speaker 134 outputs a solid tone.

Figure 2:
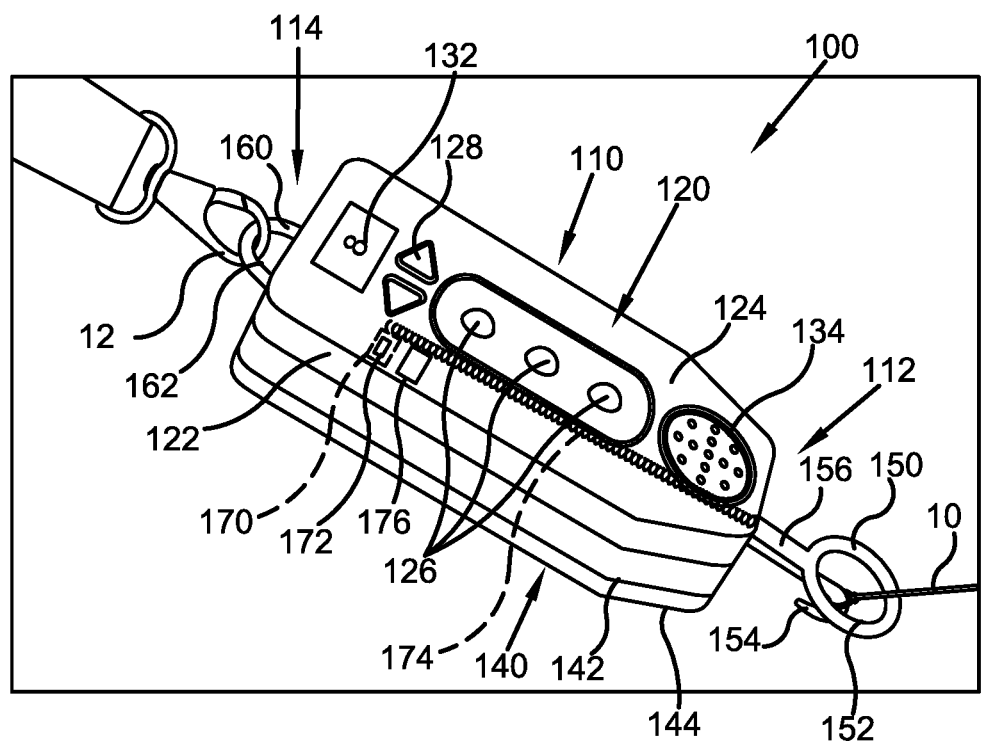
FIG. 2 illustrates a perspective view of one potential embodiment of the fishing reel drag set device of the present invention in accordance with the disclosed architecture, wherein the is non-adjustable.

FIG. 2 illustrates a perspective view of one embodiment of a fishing reel drag set device 100 of the present invention that is non-adjustable. In an alternative embodiment of the device 100, the tension setting is fixed and cannot be adjusted. In this embodiment, neither buttons 128 nor an LCD screen 130 is present. Instead, there may be indicia to signify the tension setting on the device 100, such as a painting, engraving, stickers, etc., or any other suitable indicia number(s) or letter(s) as is known in the art.

Figure 3:
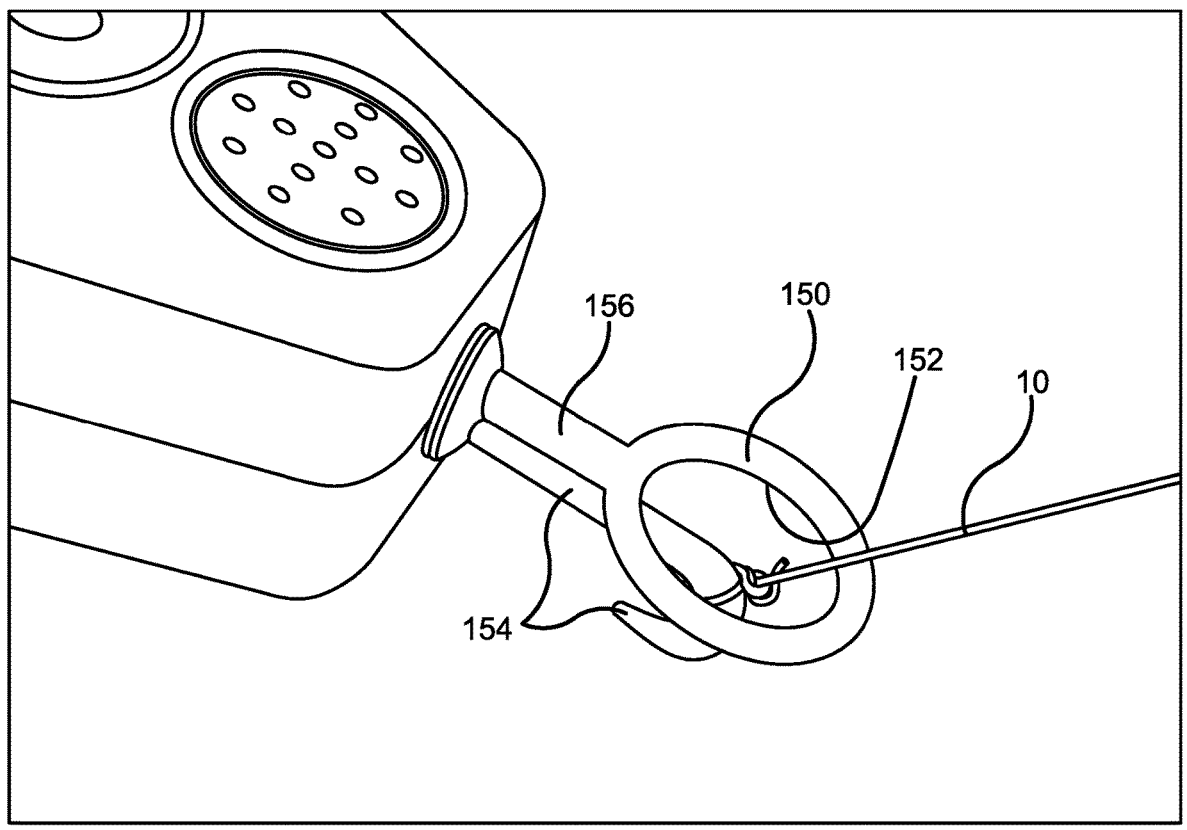
FIG. 3 illustrates an enhanced perspective view of a first eyelet and a hook of one potential embodiment of the fishing reel drag set device of the present invention in accordance with the disclosed architecture.

FIG. 3 illustrates an enhanced perspective view of a first eyelet 150 and a hook 154 of the fishing reel drag set device of the present invention. Attached to the first end of the body 112 is the first eyelet 150 which has a continuous opening 152, a hook 154 and a shaft 156. The first end of the body 112 and its attachments are manufactured of a metal, preferably stainless steel, and are designed to allow the fishing line 10 to be attached to/tied around the hook 154. The hook 154 is attached to an internal spring system, load cell or similar device 174 that measures the tension in the fishing line 10 (once the fishing line 10 has been secured to the hook 154) and is movable in an axial direction of the shaft 156. The internal spring system 174 can also be set to a specific tension via buttons 128.

The body 110 may also be comprised of an internal battery 170 that may power the LEDs 126, buttons 128, LCD screen 130, speaker 134 and spring 174. The internal battery 170 may be a disposable battery 170 or a rechargeable battery 170, in the form of an alkaline, nickel-cadmium, nickel-metal hydride battery 170, etc., such as any 3-12 volt DC battery 170 or other conventional battery 170 such as A, AA, AAA, etc., or any other suitable battery as is known in the art that can supply power to the device. Throughout this specification the terms "battery" and "batteries" may be used interchangeably to refer to one or more wet or dry cells or batteries 170 of cells in which chemical energy is converted into electricity and used as a source of DC power. References to recharging or replacing batteries 170 may refer to recharging or replacing individual cells, individual batteries 170 of cells or a package of multiple battery cells, as is appropriate for any given battery 170 technology that may be used. Additionally, due to the nature of use for the device 110, the battery 170 may also be powered through exposure to sunlight via a solar panel 176 or through a charging port 172, such as a USB port present on any surface 122, 124, 142, 144 of the body 110. In differing embodiments, the charging port 172 may be a USB port-type, such as but not limited to: USB-A, USB-B, Micro-B, Micro-USB, Mini-USB, USB-C, etc., or any other suitable charging port device as is known in the art.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "fishing reel drag set device" and "device" are interchangeable and refer to the fishing reel drag set device 100 of the present invention.

Notwithstanding the forgoing, the fishing reel drag set device 100 of the present invention and its various components can be of any suitable size and configuration as is known in the art without affecting the overall concept of the invention, provided that they accomplish the above-stated objectives. One of ordinary skill in the art will appreciate that the size, configuration and material of the fishing reel drag set device 100 as shown in FIGS. 1-3 is for illustrative purposes only, and that many other sizes and shapes of the fishing reel drag set device 100 are well within the scope of the present disclosure. Although the dimensions of the fishing reel drag set device 100 are important design parameters for user convenience, the fishing reel drag set device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A fishing reel drag set device that allows a user to set a fishing line to a desired amount of tension and that alerts the user when the desired amount of tension is reached or exceeded, the fishing reel drag set device comprising:
a body comprised of an upper and lower housing;
an LCD screen;
an internal spring or load cell within the body;
a first eyelet having a first continuous opening, wherein the first eyelet is secured to a first side of the body and comprises a hook and a shaft that is secured to the body;
a second eyelet having a second continuous opening, wherein the second eyelet is secured to a second side of the body, opposite of the first eyelet; and
an internal battery, wherein the hook is movable and is connected to the internal spring or load cell, the fishing line is secured to the hook, and further wherein the internal spring or load cell measures a tension in the fishing line.

2. The fishing reel drag set device of claim 1, wherein the upper and lower housing are fixedly secured together.

3. The fishing reel drag set device of claim 1, wherein the upper and lower housing are removably secured together, such that the upper and lower housing snap together.

4. The fishing reel drag set device of claim 3, wherein the tension in the fishing line is displayed via the LCD screen.

5. The fishing reel drag set device of claim 1, wherein the second eyelet is used for attachment to a keychain.

6. A fishing reel drag set device comprising:
a body comprised of an upper and lower housing;
an LCD screen;
at least three LEDs;
a speaker;
an internal spring or load cell within the body;
a first eyelet that is secured to a first side of the body and that comprises a continuous opening and, a hook and a shaft, wherein the shaft is secured to the body;
a second eyelet secured to a second side of the body, opposite of the first eyelet, and that comprises a continuous opening; and
an internal battery, wherein the hook is movable and is connected to the internal spring or load cell, wherein a fishing line is secured to the hook, and further wherein the internal spring or load cell measures a tension in the fishing line.

7. The fishing reel drag set device of claim 6, wherein after the fishing line has been secured to the hook, and the at least three LEDs illuminate in differing colors.

8. The fishing reel drag set device of claim 7, wherein after 25% of a fishing line class rating has been reached, one of the at least 3 LEDs illuminates green and the speaker outputs a steady beeping sound, when between 25% and 33% of the line class rating has been reached, a second of the at least 3 LEDs illuminates yellow, and when the line class rating exceeds 33%, a third of the at least 3 LEDs illuminates red and the speaker outputs a solid tone.

9. The fishing reel drag set device of claim 6, wherein the hook is movable in an axial direction of the shaft.

10. A fishing reel drag set device comprising:
a body comprised of an upper and lower housing;
at least three LED's;
a speaker;
a plurality of buttons;
an internal spring or load cell within the body;
a first eyelet with a continuous opening that is secured to a first side of the body, wherein the first eyelet is comprised of a hook and a shaft connected to the hook, wherein the hook is movable and is connected to the internal spring or load cell and measures a tension in a fishing line;
an LCD screen that displays the tension in the fishing line after the fishing line is connected to the hook;
a second eyelet with a continuous opening, secured to a second side of the body, opposite of the first eyelet;
an internal battery that can be charged by a solar panel; and
an USB charging port.

11. The fishing reel drag set device of claim 10, wherein the hook is movable in an axial direction of the shaft.

12. The fishing reel drag set device of claim 10, wherein the tension in the internal spring or load cell is adjustable or non-adjustable.

13. The fishing reel drag set device of claim 10, wherein the plurality of buttons can be used to set a specific tension within the internal spring or load cell.

14. The fishing reel drag set device of claim 10, wherein the device is comprised of an O-ring or a gasket that makes the upper housing and lower housing waterproof.

15. The fishing reel drag set device of claim 10, wherein the LCD screen displays a current tension of the fishing line in real time.

16. The fishing reel drag set device of claim 15, wherein the LCD screen displays a programmed tension the internal spring or load cell has been set at.

17. The fishing reel drag set device of claim 10, wherein after 25% of a fishing line class rating has been reached, one of the at least 3 LEDs illuminates green and the speaker outputs a steady beeping sound, when between 25% and 33% of the line class rating has been reached, a second of the at least 3 LEDs illuminates yellow, and when the line class rating exceeds 33%, a third of the at least 3 LEDs illuminates red and the speaker outputs a solid tone.

18. The fishing reel drag set device of claim 10, wherein the body has a plurality of indicia that is painted, engraved, or stickered onto the body.

19. The fishing reel drag set device of claim 18, wherein the plurality of indicia indicates the tension of the internal spring or load cell when the tension of the internal spring or load cell is non-adjustable.

20. The fishing reel drag set device of claim 10, wherein the internal battery powers the at least three LEDs, the plurality of buttons, the LCD screen, the speaker and the internal spring or load cell.

* * * * *